United States Patent
Leijten

(10) Patent No.: US 7,555,576 B2
(45) Date of Patent: Jun. 30, 2009

(54) PROCESSING APPARATUS WITH BURST READ WRITE OPERATIONS

(75) Inventor: Jeroen A. Leijten, Hulsel (NL)

(73) Assignee: Silicon Hive B.V., Eindhoven (NL)

( * ) Notice: Subject to any disclaimer, the term of this patent is extended or adjusted under 35 U.S.C. 154(b) by 0 days.

(21) Appl. No.: 11/573,816

(22) PCT Filed: Aug. 11, 2005

(86) PCT No.: PCT/IB2005/052670

§ 371 (c)(1),
(2), (4) Date: Dec. 21, 2007

(87) PCT Pub. No.: WO2006/018802

PCT Pub. Date: Feb. 23, 2006

(65) Prior Publication Data

US 2008/0109572 A1    May 8, 2008

(30) Foreign Application Priority Data

Aug. 17, 2004 (EP) .................. 04103944

(51) Int. Cl.
*G06F 13/14* (2006.01)
*G06F 13/00* (2006.01)

(52) U.S. Cl. .................. 710/35; 710/305; 711/154
(58) Field of Classification Search ............. 710/22–35, 710/305; 711/5, 104, 122, 133, 141, 154–156
See application file for complete search history.

(56) References Cited

U.S. PATENT DOCUMENTS

| 5,781,918 | A | * | 7/1998 | Lieberman et al. | 711/5 |
| 5,835,972 | A | * | 11/1998 | Choate | 711/220 |
| 6,496,905 | B1 | * | 12/2002 | Yoshioka et al. | 711/154 |
| 6,574,707 | B2 | | 6/2003 | Shaw | |

FOREIGN PATENT DOCUMENTS

EP   0374074 A   6/1990

* cited by examiner

*Primary Examiner*—Christopher B Shin
(74) *Attorney, Agent, or Firm*—Leydig, Voit & Mayer Ltd.

(57) ABSTRACT

A digital signal processing system comprises a programmable processor (PROC) and a peripheral device (PD, MEM) coupled to the programmable processor via a burst generation device (BG). The processor is arranged to communicate with the peripheral device using a read operation and a write operation, respectively, on a single data element. The burst generation device (BG) groups a plurality of read operations or a plurality of write operations in a single burst read operation or a single burst write operation, respectively.

13 Claims, 2 Drawing Sheets

PROCESSING APPARATUS WITH BURST READ WRITE OPERATIONS

TECHNICAL FIELD

A digital signal processing system comprising a programmable processor and a peripheral device coupled to the programmable processor, wherein the processor is arranged to communicate with the peripheral device using a read operation and a write operation, respectively, on a single data element.

BACKGROUND ART

Although computation power of programmable processors is still increasing in that operations are executed at higher rates, by increasing clock frequencies, or in parallel with other operations, by using parallel architectures such as Very Large Instruction Word processors or superscalar processors, the overall performance of systems based on these processors is often hampered by limitations in the bandwidth of peripheral devices, such as an Input/Output (I/O) device, a physical memory or a data bus. In order to alleviate these limitations, (multilevel) caches may be incorporated in these systems to keep data local to the processor as much as possible, thereby decreasing the required data bandwidth for retrieving data from more distant parts of the system, as disclosed in U.S. Pat. No. 6,574,707 B2. Furthermore, whenever bus or memory bandwidth, for example, is needed, e.g. on a cache miss, efficient use of this bandwidth is made by using a so-called burst operation by which multiple data elements are packed into a single atomic operation, requiring less control overhead. Typically, programmable processors generate I/O requests via read operations and write operations working on a single data element. By using a cache these single data element operations are automatically converted to burst operations, since a cache provides an interface to the processor, whereby the processor is serviced using single element operations, while the other parts of the system are typically accessed using burst operations. The latter holds in particular for read operations, where in case of a cache miss, a cache will fetch an entire cache line that is requested from the system using one or more burst operations. Processor writes in the presence of a cache may either result in burst behavior or single element access dependent on the cache write policy used. While a cache using a "write-through" policy will write single data elements to the system, a cache using the so-called "write-back" write policy will predominantly write complete cache blocks to the system in burst mode. As long as a write hits in the cache, only the data in the cache will be updated. Only when the cache block that has been changed because of such a write hit (i.e. has become "dirty") has to be evicted from the cache to make room for a newly fetched block to be stored at the same cache location, the dirty block will be written back to the system. In the case of a write miss, the cache will either fetch the missing block of data and subsequently write to the fetched block in the cache ("write back" with "write allocate" policy) or it will bypass the cache and directly write a single data element to the system ("write back" with "no write allocate" policy).

Especially in case of cost-sensitive and low-power applications, the use of a cache has major drawbacks in terms of area and power dissipation overhead. Furthermore, for real-time systems, the dynamic behavior of a cache makes predicting guaranteed real-time performance difficult. For signal processing applications that process data streams, a conventional cache mostly has little performance benefits since data items are often read and written once, and no temporal data locality can be exploited. For these reasons, embedded systems may only use a relatively simple cache, or no cache at all. A relatively simple cache uses a write-through with no-write-allocate write policy, i.e. in case data are written at a memory address present in the cache, the data are written both in the cache and the memory, whereas in case data are written at a memory address not present in the cache, the data are only written in the memory without retrieving them from the memory into the cache. In such embedded systems hardwired accelerators are often designed such that they will perform system I/O in a burst manner. Since these accelerators are tuned to a specific application it is usually feasible to tune the accelerator to the system environments in which it will be applied, so that this kind of behavior is ensured. The demand for more flexible systems-on-chip leads to a situation where programmable accelerators are increasingly used. Such programmable processors are often based on load/store architectures where these processors communicate with a system using read and write operations that work on single data elements, that is, each read/write operation consists of a single address wherefrom a single data element matching the processor's data path width (e.g. a 32 bit word) should be read or an address at which a single data element should be written, under the control of a software program. Although the programmer may map (signal processing) applications that access system data in a streaming manner there is usually no way for the programmer to control how the processor accesses system data. If a cache is not present in the system, the single data element operations will go straight to the system bus or memory, for example, leading to inefficient use of the available bandwidth due to the overhead of setting up a new transfer for each individual data item. This will result in a poor bus/memory bandwidth usage and may severely impact the overall system performance.

DISCLOSURE OF INVENTION

An object of the invention is to provide an efficient, low-cost and low-power programmable processing system having no cache or only a relatively simple cache.

This object is achieved by means of a processor of the kind set forth, which is characterized by a burst generation device arranged to group a plurality of read operations or a plurality of write operations in a single burst read operation or a single burst write operation, respectively. By converting the read and write operations on single data elements into single burst read and write operations, the available bandwidth for the peripheral device is used more efficiently, increasing the overall performance of the processing system. No cache is required for generating the burst operations, but instead a dedicated circuit is used, allowing a low-cost and low-power solution compared to programmable processing systems with a cache.

An embodiment of the invention is characterized in that the programmable processor is further arranged to communicate with the peripheral device using a burst read operation or a burst write operation, respectively, and wherein the burst generation device is further arranged to group the burst read operation and a further burst read operation, or at least one read operation, in the single burst read operation, and to group the burst write operation and a further burst write operation, or at least one write operation, in the single burst write operation, respectively. Burst operations generated by the programmable processor can be combined with one or more operations on single data elements, or alternatively with one or more other burst operations, to form a single burst operation, allowing a more efficient use of the available bandwidth of peripheral devices.

An embodiment of the invention is characterized in that the burst generation device is further arranged to divide the burst read operation or the burst write operation, respectively, into two or more burst operations, if the burst read operation or burst write operation, respectively, has a size larger than the desired size of the single burst read operation or single burst write operation, respectively. In case the burst operation has a size larger than the desired size of the single burst operation, the burst operation is divided into two or more burst operations. The size of the latter can be equal to the desired size of the single burst operation, or smaller, and in the latter case the resulting burst operation can be combined with a further burst operation, or with at least one single data element operation, in a single burst operation.

An embodiment of the invention is characterized in that the programmable processor comprises at least one configuration register arranged for storing control information for the burst generation device. The configuration registers inside the processor can be programmed to control the burst generation device to behave in different manners. These configuration registers can either be programmed from the processing system or from within the programmable processor itself.

An embodiment of the invention is characterized in that the configuration register is arranged to store the desired size of the single burst read operation or the single burst write operation, respectively. By selecting the size of the single burst operation, an optimum between reducing the number of operations on the one hand and avoiding a too long delay in executing the operations on the other hand can be found, depending on the characteristics of the application as well as that of the processing system.

An embodiment of the invention is characterized in that the configuration register is further arranged to store a time out value, used for controlling the maximum time interval between two subsequent single burst operations. A single burst operation is prematurely released if the time interval between consecutive operations on single data elements, received by the burst generation device, is larger than the time out value, thereby avoiding a too long delay in performing the operations.

An embodiment of the invention is characterized in that the burst generation device comprises: a collector circuit arranged to receive the read and write operations from the programmable processor, and to generate dedicated tokens, based on information derived from the read and write operations, triggering the release of the single burst read operation or the single burst write operation, respectively; a first FIFO buffer for storing the dedicated tokens; a second FIFO buffer for storing information derived from the read and write operations, respectively; a release circuit arranged to initiate the release of the single burst write operation or the single burst read operation, respectively, from the second FIFO buffer, under the control of a dedicated token received from the first FIFO buffer. This embodiment of the burst generation device requires only two relatively simple circuits and two FIFO buffers, providing a low-cost and low-power solution.

An embodiment of the invention is characterized in that the burst generation device is further arranged to trigger the release of the single burst read operation or the single burst write operation, respectively, if the single burst operation has a size not equal to the desired size of the single burst operation. Under certain conditions it may be advantageous to release the single burst operation even if it does not have the desired size in order to improve the overall system performance.

An embodiment of the invention is characterized in that the release of the single burst operation depends on whether the plurality of read operations or the plurality of write operations refers to a corresponding plurality of memory addresses that are in increasing order with a step size corresponding to that of a single data element. Dependent on the communication or peripheral device used, different addressing schemes may be supported that influence the rules for burst release by the burst generator. The simplest one is burst accesses supported by addresses that are in increasing order, one data element address apart. Alternative schemes, may allow wrap-around addressing. This is for example the case with buses supporting critical-word-first cache fetches. In this case, rather than requesting a sequence of data at addresses 0, 4, 8, 12, a cache could request a sequence of data at addresses 8,12,0,4 instead, if the data element at address 8 is the one that is required first by the processor using the cache. Other bus or memory protocols may allow multi-dimensional burst accesses, in which case bursts may be constructed of data elements at addresses that form a multi-dimensional space in the memory map. An example of this is a bus that supports 2D burst access to support the efficient reading and writing of 2D blocks of data that are commonly used in graphics and video processing applications.

An embodiment of the invention is characterized in that the release of the single burst operation depends on whether the next burst write or read operation, respectively, received by the burst generation device has a size equal to the desired size of the single burst operation. In case the programmable processor issues a burst operation that is already of the desired size, a single burst operation being grouped by the burst generation device at that moment is released, even if it does not have the desired size, to avoid fragmentation of said burst operation issued by the processor.

An embodiment of the invention is characterized in that the release of the single burst operation depends on the receipt of a flush command from the programmable processor. This embodiment allows to release a single burst operation under the control of the programmable processor, for example to ensure that all data are eventually written to the peripheral device at the end of processing.

An embodiment of the invention is characterized in that the (burst) read or write operation, respectively, is arranged to comprise the following information: an identifier indicating the validity of the (burst) read or write operation, respectively; an identifier indicating a (burst) read operation or a (burst) write operation, respectively; a memory address where the (burst) read or the (burst) write operation, respectively, refers to; data to be written in the memory, in case of a (burst) write operation; an identifier indicating the start of a (burst) read operation or a (burst) write operation, respectively; an identifier indicating the size of the (burst) read operation or the (burst) write operation, respectively.

Using the information encoded in the (burst) operations issued by the programmable processor, the burst generation device recognizes the type of operation, i.e. a read or write operation, and a single element operation or a burst operation, and uses this information to group the (burst) operations into single burst operations.

An embodiment of the invention is characterized in that the (burst) read or write operation, respectively, further comprises the following information: an identifier indicating the number of bits, i.e. data type (e.g. byte, half word, or word) of a single data element that the (burst) operation refers to; a mask identifier indicating the bit positions in a single data element where data have to be written, in case of a (burst) write operation. Using this additional information, data can be read from or written to specific bit positions within a data element.

An embodiment of the invention is characterized in that the peripheral device is a physical memory. An embodiment of the invention is characterized in that the peripheral device is a communication device. Both a communication device, such as a system bus, and a physical memory are peripheral devices in a processing system that are frequently accessed using (burst) read and write operations, making the invention particularly advantageous for these devices.

DESCRIPTION OF EMBODIMENTS

Figure 1:
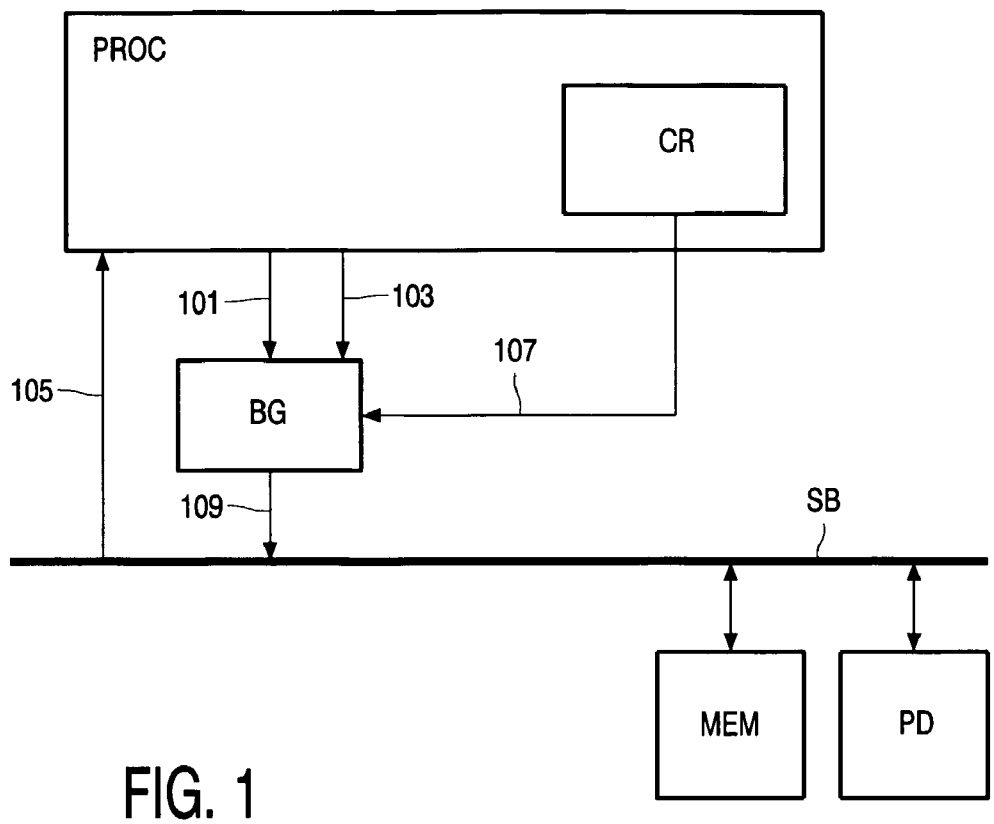
FIG. 1 is a schematic diagram of a processing system according to the invention.

FIG. 1 is a schematic diagram of a processing system, comprising a programmable processor PROC, a burst generator BG, a system bus SB, a memory MEM and a peripheral device PD. The memory MEM is a synchronous dynamic random access memory (SDRAM), for example. The peripheral device PD is a display, or a network connection, for example. Both the memory MEM and the peripheral device PD are coupled to the system bus SB. The system bus SB may comprise a separate address bus and a separate data bus, or alternatively a combined address and data bus. The data bus is a 32 bit wide data bus, for example. The processor PROC is a RISC processor, for example, executing RISC types of operation, typically comprising an operation code for the type of operation to be performed, one or two register indices specifying the location for retrieving the argument data, and a register index specifying the location for writing the result data. Read and write operations are specific operations, i.e. the argument of a read operation is a memory address, whereas the arguments of a write operation are a memory address and the data to be stored, which are sent to the memory interface. The result of the read operation is the data to be read. Alternatively, the processing system may comprise more than one programmable processor for processing data in a streaming manner, wherein successive operations on data are performed by different processors. The I/O ports of the processor PROC are coupled to the input ports of the burst generator BG via connections 101 and 103. The output port of the burst generator BG is coupled to the system bus SB via connection 109. Data that are read from the memory MEM or peripheral device PD are transferred to the processor PROC via the system bus SB and connection 105. The processor PROC has configuration registers CR that can be programmed to control the burst generator BG to behave in a desired manner, via connection 107. In operation, the processor PROC communicates with the other parts of the processing system, using read operations and write operations, in order to read or write single data elements via memory-mapped I/O addresses. Under the control of a software program, the processor PROC performs the read operations, processes the read data, and performs the write operations. Alternatively, the processor PROC communicates with the other parts of the processing system using burst read operations, or burst write operations, e.g. if a cache is present.

Figure 2:
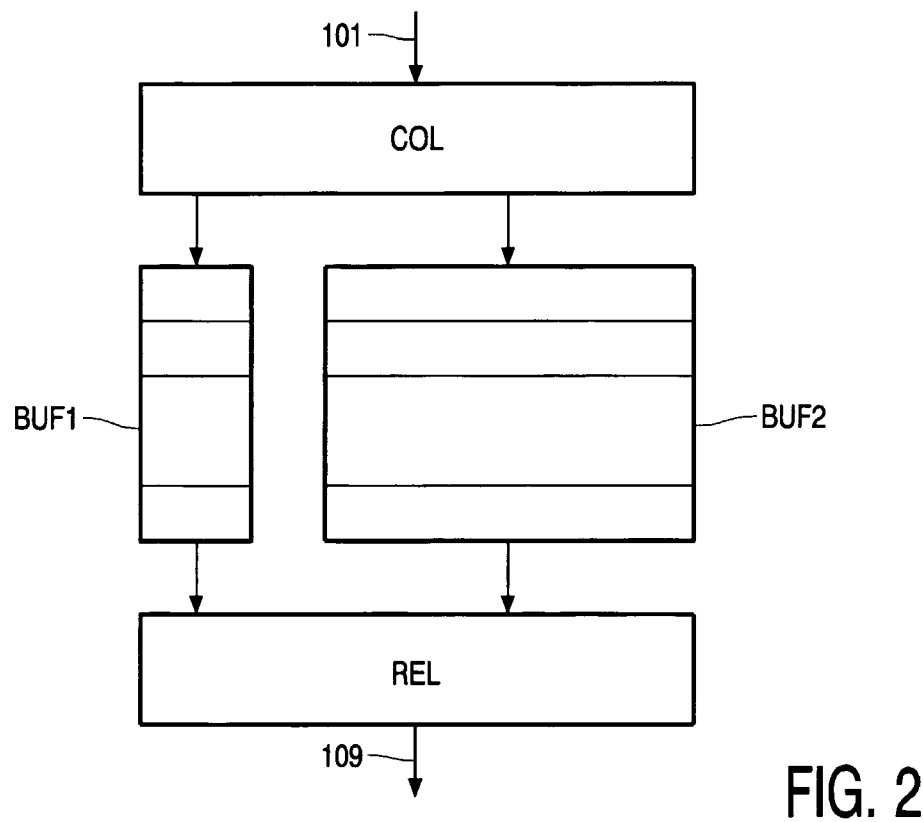
FIG. 2 is a schematic diagram of an embodiment of a burst generation device.

FIG. 2 is a schematic diagram of the burst generator BG, comprising a collector COL, a First-In-First-Out buffer BUF1, a First-In-First-Out buffer BUF2 and a releaser REL. Both buffers BUF1 and BUF2 are of the blocking type, meaning that the collector COL will stall on attempting to write information in buffers BUF1 and BUF2 that are full, and the releaser REL will stall on attempting to read information from buffers BUF1 and BUF2 that are empty. In operation, the collector COL receives read and write operations from the processor PROC in the form of a collection of signals:

the valid signal indicates the validity of the operation, and when equal to false indicates a NOP operation, otherwise equal to true, the write enable signal we, when equal to true, indicates that the operation refers to a write operation, and when equal to false indicates that the operation refers to a read operation, the address signal addr indicates the memory mapped I/O address that the operation refers to, the write data signal wdata holds the data to be written in case of a write operation, the start signal, when true, indicates the start of a (burst) read or write operation, the size signal refers to the size of the (burst) read or write operation minus one, i.e. the number of single data elements involved in the operation minus one.

As will be discussed below, the collector COL collects incoming (burst) read and write operations from the processor PROC into single burst read or write operations, if appropriate. The information received by the collector COL in the form of the collection of signals is written by the collector COL in the buffer BUF2. Furthermore, the collector COL writes release tokens in the buffer BUF1, indicating that (burst) read or write operations have to be released from the buffer BUF2 in a single burst read or write operation. In case the programmable processor PROC only supports read and write operations on single data elements, this means that when such an operation is issued the start signal is true and the size signal is equal to zero, i.e. indicating a burst size of one. Alternatively, in case the processor PROC also supports burst read and write operations, the size signal may indicate a burst size larger than one, and the start signal is only true at the start of such a burst operation.

Figure 3:
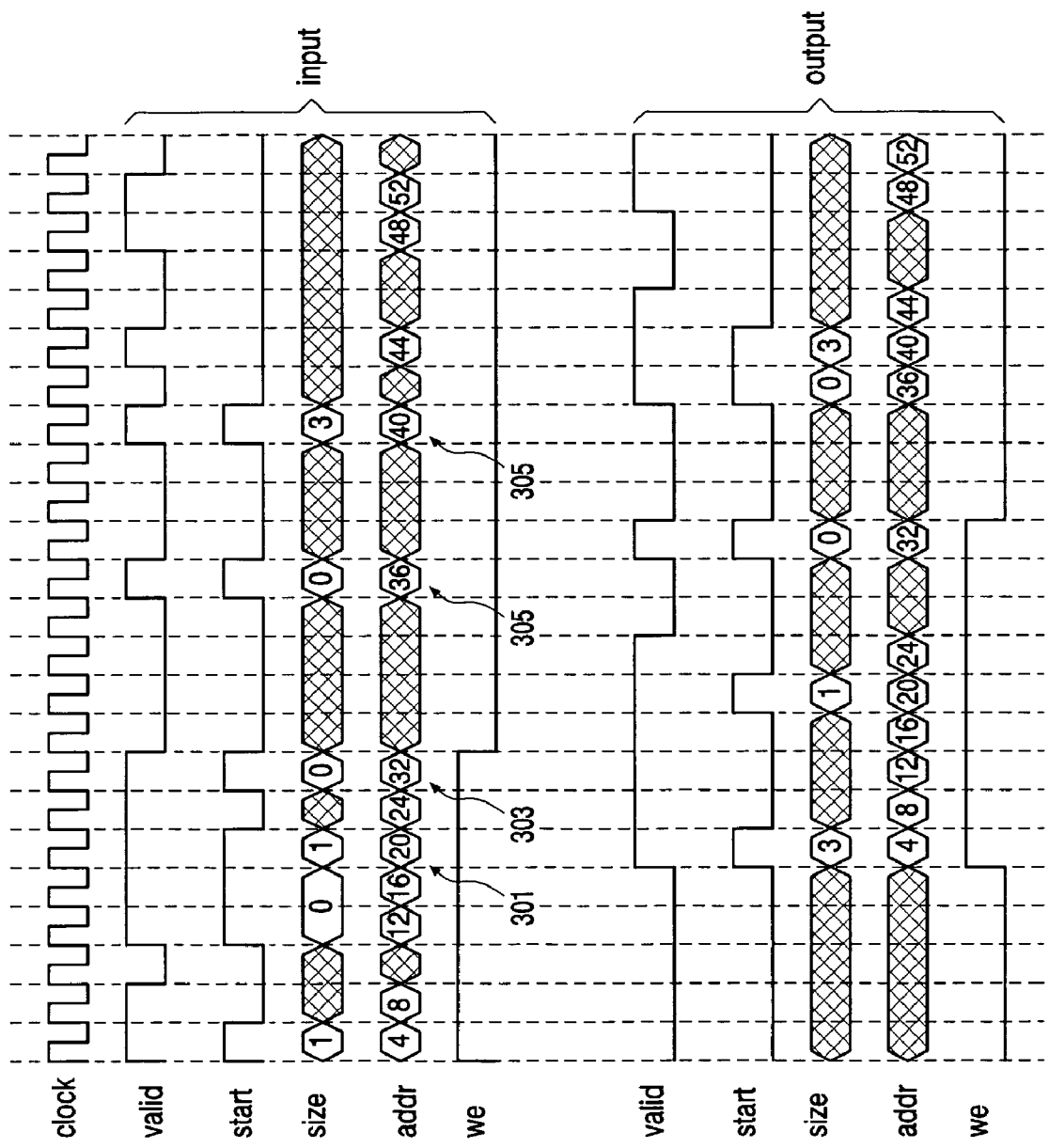
FIG. 3 is a timing diagram showing the input signals and output signals during operation of a burst generation device according to FIG. 2.

FIG. 3 is a timing diagram showing the input signals and output signals during operation of the burst generator BG shown in FIG. 2. The burst generator BG is configured, via configuration registers CR, to compose single burst read and write operations with a size of four, i.e. involving four single data elements. The 32-bit data elements are written in the memory MEM or peripheral device PD, and the memory addresses of the memory MEM and peripheral device PD are represented as byte addresses, i.e. addresses 4, 8, 12 etc. The clock signal clock represents the signal generated by a clock of the processing system, not shown in FIG. 1. In the upper part of FIG. 3 the signals at the input 101 of the burst generator BG are shown, and in the lower part of FIG. 3, the signals at the output 109 of the burst generator BG are shown. Referring to FIG. 3, the burst generator BG first receives a burst write operation from the processor PROC, since the valid signal, the write enable signal we and the burst start signal start are high, while the size signal has a value of "1", i.e. the burst write operation has a burst size of two data elements. The data elements have to be written to memory mapped addresses "4" and "8", as indicated by the addr signal. Next, the burst generator BG receives two single data element write operations for memory addresses "12" and "16", respectively, as indicated by the burst size signal size having a value of "0", the start signal being high during both clock signals, and the valid and we signal being high as well. When receiving the write operation for memory address "16", the collector COL has collected a single burst write operation of size four, and puts a token with a value of "3" in the release token buffer BUF1. The token is a value that represents the number of write operations that the collector COL has collected in the single burst write operation, that is scheduled for release, minus one. At the clock signal referred to by 301, the first single burst write operation is scheduled for release. The releaser REL receives the token with a value of "3" and uses this token value to initialize a counter that it maintains to keep track of the number of write operations to be released. Subsequently, the releaser REL retrieves the corresponding four write operations from the buffer BUF2, constructs a single burst write operation of the four write operations, and sends the single burst write operation to the memory mapped addresses "4", "8", "12" and "16" via output 109 and the system bus SB, as indicated by the size signal of "3" and the addr signals at the output port of the releaser REL. After the composition of a first single burst write operation, a second one is composed. The collector COL receives a burst write operation for two data elements at memory mapped addresses "20" and "24", respectively, as indicated by the size signal equal to "1", the addr signals "20" and "24", and the valid, start and we signals being high. Next, the collector COL receives a write operation for memory address "32". Though the desired burst operation size of four is not reached at the moment of receiving the write operation for memory mapped address "32", the second single burst write operation composed so far is released prematurely, since the memory mapped address of the last received write operation is not the proper distance apart from the memory address of the previous write operation, i.e. memory mapped address "32" is not the proper distance (i.e. at memory mapped address "28") apart from memory address "24", since the single burst write operation already composed so far contains write operations at memory mapped addresses "20" and "24" respectively. The collector COL puts a token with the value "1" in the release token buffer BUF1. At the clock signal referred to by 303, the second burst write operation is scheduled for release. The releaser REL receives the token with a value of "1" and uses this token value to initialize a counter that it maintains to keep track of the number of write operations to be released. Subsequently, the releaser REL retrieves the corresponding two write operations from the buffer BUF2, constructs a single burst write operation of the two write operations, and sends the single burst write operation to the memory mapped addresses "20" and "24" via output 109 and the system bus SB, as indicated by the size signal of "1" and the addr signals at the output port of the releaser REL. The write operation for memory address "32" forms the first operation for a third single burst write operation. The third single burst write operation is scheduled for release prematurely at clock signal 305, since a single data element read operation is received for memory address "36", and write and read operations are not combined in a single burst operation. The read operation for memory address "36" is indicated by the we signal being low, the valid signal and start being high, the size signal equal to zero, and an addr signal of "36". The collector COL puts a token with the value "0" in the release token buffer BUF1. The releaser REL receives this token and uses it as a value to initialize a counter that it maintains to keep track of the number of write operations to be released. Subsequently, the releaser REL retrieves the corresponding write operation from the buffer BUF2, constructs a single burst write operation of the one write operation, and sends the third single burst write operation to the memory address "32" via output 109 and the system bus SB, as indicated by the size signal of "0" and the addr signal at the output port of the releaser REL. The first single burst read operation is scheduled for release prematurely at the clock signal 307, since the next burst read operation received by the collector COL is already of the desired size of four, as indicated by the size signal of "3" and the addr signals "40", "44", "48" and "52" at the input port 101 of the collector COL. The collector COL puts a token with a value of "0" into the release token buffer BUF1. The releaser REL retrieves this token from the buffer BUF1, and constructs a single burst read operation of the read operation retrieved from buffer BUF2. The single burst read operation is released by the releaser REL, as indicated by the size signal of "0" and addr signal of "36" at the output port 109 of the releaser REL. The second single burst read operation is composed of the last received burst read operation. A token with the value of "3" is put in the release token buffer BUF1, and the releaser REL composes the second single burst read operation from the information derived from the buffer BUF2. The size signal of "3" and addr signals of "40", "44", "48" and "52" at the output port of the releaser REL indicate the release of the second burst read operation.

In an alternative embodiment, the processing system further comprises a relatively simple cache using a write-through with no-write allocate write policy, positioned between the programmable processor PROC and the burst generator BG. In case of read operations the cache converts single data element read operations into burst read operations. For write operations, the burst generator BG composes single burst write operations from the (burst) write operations received from the programmable processor PROC. In case of burst read operations the start signal received by the burst generator BG is only true at the start of such a burst read operation, and the size signal will typically hold a value equal to the size of a cache block minus one, i.e. indicating a burst size equal to the cache block size. In case of single data element write operations, the start signal is equal to true and the size signal carries a value "0", indicating a burst size of 1.

In a further alternative embodiment, the burst generator BG is arranged to receive a flush input signal from the programmable processor PROC, via connection 103, see FIG. 1. When the flush signal is high, the current single burst operation being composed is scheduled for release by the collector COL, even if it does not have the proper size. In this way, it is ensured that operations will not remain forever in the buffer BUF2, for example at the end of processing when insufficient elements to complete a single burst operation are available.

In another further alternative embodiment, the collector comprises a timer counting the number of clock cycles between consecutive incoming (burst) read or write operations. If the counter value exceeds a certain configurable value, the current single burst operation being composed is scheduled for release by the collector COL, even if it does not have the proper size. In this way it is ensured that operations will not remain too long in the burst generator before being released, which would lead to a long latency that could impact the overall system performance. The configurable time out value may be set via the configuration registers CR.

In another further alternative embodiment the collector COL further receives a data size signal dsize and a write mask signal wmask from the programmable processor PROC, which can be used to indicate the exact number of bits of a data element that the operation refers to. The wmask signal indicates specific bit positions in the data element for storing data. The dsize and wmask signal allow to write and read only parts of a single data element, e.g. a specific byte of a 32-bit data element.

In another further alternative embodiment, different addressing schemes may allow wrap-around addressing. This is for example the case with buses supporting critical-wordfirst cache fetches. In this case, rather than requesting a sequence of data at addresses 0, 4, 8, 12, a cache could request a sequence of data at addresses 8,12,0,4 instead, if the data element at address 8 is the one that is required first by the processor using the cache. Other bus or memory protocols may allow multi-dimensional burst accesses, in which case bursts may be constructed of data elements at addresses that form a multi-dimensional space in the memory map. An example of this is a bus that supports 2D burst access to support the efficient reading and writing of 2D blocks of data that are commonly used in graphics and video processing applications.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A digital signal processing system comprising a programmable processor and a peripheral device coupled to the programmable processor, wherein the processor is arranged to communicate with the peripheral device using a read operation and a write operation, respectively, on a single data element, comprising a burst generation device arranged to group a plurality of read operations or a plurality of write operations in a single burst read operation or a single burst write operation, respectively, the burst generation device comprising:
    a collector circuit arranged to receive the read and write operations from the programmable processor, and to generate dedicated tokens, based on information derived from the read and write operations, triggering a release of the single burst read operation or the single burst write operation, respectively;
    a first FIFO buffer for storing the dedicated tokens;
    a second FIFO buffer for storing information derived from the read and write operations, respectively; and
    a release circuit arranged to initiate the release of the single burst write operation or the single burst read operation, respectively, from the second FIFO buffer, under the control of a dedicated token received from the first FIFO buffer.

2. A digital signal processing system comprising a programmable processor and a peripheral device coupled to the programmable processor, wherein the processor is arranged to communicate with the peripheral device using a read operation and a write operation, respectively, on a single data element, comprising a burst generation device arranged to group a plurality of read operations or a plurality of write operations in a single burst read operation or a single burst write operation, respectively, wherein the programmable processor is further arranged to communicate with the peripheral device using a burst read operation or a burst write operation, respectively, and wherein the burst generation device is further arranged to group the burst read operation and a further burst read operation, or at least one read operation, in the single burst read operation, and to group the burst write operation and a further burst write operation, or at least one write operation, in the single burst write operation, respectively, characterized in that the (burst) read or (burst) write operation, respectively, is arranged to comprise the following information:
    an identifier indicating the validity of the (burst) read or (burst) write operation, respectively;
    an identifier indicating a (burst) read operation or a (burst) write operation, respectively;
    a memory address where the (burst) read or the (burst) write operation, respectively, refers to;
    data to be written in the memory, in case of a (burst) write operation;
    an identifier indicating the start of a (burst) read operation or a (burst) write operation, respectively; and
    an identifier indicating the size of the (burst) read operation or the (burst) write operation, respectively.

3. A processing system according to claim 1, characterized in that the programmable processor comprises at least one configuration register arranged for storing control information for the burst generation device.

4. A processing system according to claim 3, characterized in that the configuration register is arranged to store a desired size for a single burst read operation or a desired size for a single burst write operation, respectively.

5. A processing system according to claim 4, characterized in that the configuration register is further arranged to store a time out value, used for controlling the maximum time interval between two subsequent single burst operations.

6. A processing system according to claim 2, characterized in that the burst generation device is further arranged to trigger a release of the single burst read operation or the single burst write operation, respectively, if the single burst operation has a size not equal to a desired size of the single burst operation.

7. A processing system according to claim 6, characterized in that the release of the single burst operation depends on whether the plurality of read operations or the plurality of write operations refers to a corresponding plurality of memory addresses that are in increasing order with a step size corresponding to that of a single data element.

8. A processing system according to claim 6, characterized in that the release of the single burst operation depends on whether the next burst write or read operation, respectively, received by the burst generation device has a size equal to the desired size of the single burst operation.

9. A processing system according to claim 6, characterized in that the release of the single burst operation depends on the receipt of a flush command from the programmable processor.

10. A processing system according to claim 2, characterized in that the burst generation device is further arranged to divide the burst read operation or the burst write operation, respectively, into two or more burst operations, if the burst read operation or burst write operation, respectively, has a size larger than a desired size for a single burst read operation or a desired size for a single burst write operation, respectively.

11. A processing system according to claim 2, characterized in that the (burst) read or write operation, respectively, further comprises the following information:
    an identifier indicating the number of bits of a single data element that the (burst) operation refers to;
    a mask identifier indicating the bit positions in a single data element where data have to be written, in case of a (burst) write operation.

12. A processing system according to claim 1, characterized in that the peripheral device is a physical memory.

13. A processing system according to claim 1, characterized in that the peripheral device is a communication device.

* * * * *